United States Patent [19]
Bohlinger

[11] Patent Number: 5,222,165
[45] Date of Patent: Jun. 22, 1993

[54] OPTICAL FIBER ELASTOMERIC SWITCH DEVICE

[76] Inventor: J. Jerry Bohlinger, 300 Gulp Hills Rd., Radnor, Pa. 19087

[21] Appl. No.: 890,444

[22] Filed: May 29, 1992

[51] Int. Cl.⁵ .................. G02B 6/02; G01L 1/24; G01D 5/30
[52] U.S. Cl. .................. 385/16; 385/13; 385/32; 385/88; 385/92; 73/800; 250/227.16; 250/231.19
[58] Field of Search .................. 385/12, 13, 14, 16, 385/32, 140, 147, 88, 89, 92, 94, 100; 73/800; 250/227.16, 231.19, 227.11

[56] References Cited

U.S. PATENT DOCUMENTS

| | | | |
|---|---|---|---|
| 4,071,753 | 1/1978 | Fulenwider et al. | 250/227.11 X |
| 4,148,558 | 4/1979 | Schuck | 250/227.11 X |
| 4,405,197 | 9/1983 | Bejczy | 385/147 X |
| 4,408,495 | 10/1983 | Couch et al. | 250/227.16 |
| 4,531,811 | 7/1985 | Hick | 385/11 X |
| 4,701,614 | 10/1987 | Jaeger et al. | 385/13 X |
| 4,830,461 | 5/1989 | Ishiharada et al. | 385/13 X |
| 4,915,473 | 4/1990 | Haese et al. | 385/13 X |
| 4,927,232 | 5/1990 | Griffiths | 385/13 X |
| 5,026,141 | 6/1991 | Griffiths | 385/13 X |
| 5,026,984 | 6/1991 | Gerdt | 250/231.19 |
| 5,056,884 | 10/1991 | Quinlan, Jr. | 385/13 X |
| 5,091,983 | 2/1992 | Lukosz | 385/13 X |

OTHER PUBLICATIONS

Bertholds et al., "High-Resolution Photoelastic Pressure Sensor . . ." Applied Optics vol. 25 No. 3 Feb. 1986 pp. 340-343.

Primary Examiner—Brian Healy
Attorney, Agent, or Firm—Eugene E. Renz, Jr.

[57] ABSTRACT

An optical switch device, comprising enclosed switch chamber, preferably in the form of a cylinder, in which an elastomeric rubber optical cable is positioned and formed into a loop. The cable, preferably comprising an optical wave transmitting core and a clad, and preferably formed into a 180° loop, -terminates in a connector for transmitting light through the cable. An elastomeric encapsulating material fills the enclosed chamber with the cable, and includes an exposed portion forming an actuation member for actuating the switch device upon contact on the actuation member. The elastomeric encapsulating material deforms upon actuation to transmit pressure to the cable to transmit both flattening forces to flatten a portion of the cable and compressive forces to radially inwardly compress the cable. Light which is being transmitted through the cable is altered by those two forces. The switch is mounted in a predetermined location. The connector may include a light emitter and a light receiver as well as a signal unit for providing a signal when the light transmitted through the cable is altered by the flattening forces and the compressive forces. In a preferred embodiment, fiber optic cables are used for transmitting light from the light emitter to the cable and from the cable to the light receiver.

6 Claims, 1 Drawing Sheet

OPTICAL FIBER ELASTOMERIC SWITCH DEVICE

FIELD OF THE INVENTION

The present invention relates to an optical switch device which operates without electricity, using light which is transmitted to and from a sending unit via an elastomeric rubber optical medium which is part of the switch device itself. More particularly, the present invention relates to a switch device which combines the transmission capabilities of fiber optical transmission lines with the sensitivity and dependability of elastomeric rubber optical fibers.

BACKGROUND OF THE INVENTION

Switches have undergone the same evolution as other areas of technology, from mechanical to electrical devices. Efforts have also been made to design switches which employ optical means, such as light being transmitted from a transmitter to a receiver. The early electric eye door opening devices are examples of basic optical switch design.

As technology has progressed, many functions which have in the past been performed electrically are now being performed using fiber optics. Telephone signal transmission is one area where fiber optical devices are enjoying great success and adoption. Fiber optical devices are admirably suited for stable transmission of light over remarkably long distances.

Fulenwider et al U.S. Pat. No. 4,071,753 discloses a transducer which converts acoustical energy directly into optical energy. This design contemplates a device in which modulated optical power is transmitted from a transducer to provide information in the form of the resulting modulation of the output power. Schuck U.S. Pat. No. 4,148,558 also uses fiber optics to convey information in systems where an optical by-pass relay is interposed for the insertion of a utilization device. Both patents are examples of the use of optical fibers which transmit light from one point to another.

It is also known to modify the nature of fiber optic transmission. U.S. Pat. No. 4,531,811 to Hicks describes a device in which a polarizer is inserted between an input fiber and an output fiber. It is stated that sheet polarizers are normally quite disadvantageous, so that polarizers which are fiber or fiber-like are used. Advantages in transmission efficiencies and in reduced loss are described.

Fiber optical switching devices are described in Quinlan U.S. Pat. No. 5,056,884, in which fiber optics form part of a switch which is used for sensing the passage of a vehicle over a treadle. Light is passed along a fiber optic cable through a region which is subjected to force from the weight of a vehicle passing over the designated area of the device where the cable is located. Quinlan describes the effect of deformation of the fiber during transmission of light by the force of the vehicle or the like, where light passing down the fiber appears virtually to be switched off by pressure applied to the device as constructed. Quinlan discloses that the movement required to give attenuation to this light is only 0.04 mm. It is noted that the fibers can be squeezed a further 0.1 mm before it is over stressed.

This does point out the most significant drawback of fiber optical devices generally, which is the inability of fiber optical materials to flex or bend without incurring significant damage to the fibers. Fibers can be assembled into a variety of shapes, using proper care of the fiber, and damage to the fiber optical properties are minimal. However, any repetitive flexing such as in a switching system of the type described in Quinlan, for example, presents a real risk of damage to the fibers. When, as in Quinlan, movement of only 0.04 mm is adequate to produce the result desired, a safety factor of 2.5 times that movement, or 0.1 mm may be appropriate for large devices where vehicle weight activates the system. For smaller devices, limitations on movement to prevent damage to the fiber optics have prevented the adoption of such fiber optical systems to any great extent. Even though fiber optical cables are capable of transmitting light over great lengths, switching and other operations which require movement of the cable have not meet with any success.

One such method to overcome the deficiencies of fiber optical switching designs is shown in Jaeger et al U.S. Pat. No. 4,701,614 where an optical fiber is surrounded by an two coating layers concentrically clan to and coaxially oriented with the optical fiber. The first layer is a relatively hard optically lossy material which absorbs light radiating outwardly from the fiber. The second coating layer is comprised of a compliant material which imparts micro-bends onto the optical fiber to cause change from optical propagating modes to non-propagating modes. No dimensional changes are set forth in Jaeger et al, but it is clear that the second coating layer is intended to take most of the flexing force in order to protect the optical fiber itself.

At this point in time, there really have not been any successful suggestions to make optical switches from optical fibers. The need for physical movement of the fiber has prevented such use, and most proposals involve mechanical or electricto-optical devices to act as a switch at some junction of the fiber.

Another type of optical fiber has come into use in some instances, known as polymer optical fibers. Haese et al U.S. Pat. No. 4,915,473 discloses a pressure sensing device in which a polymer optical fiber is employed. This fiber includes a core formed from a flexible thermoplastic aliphatic segmented polyurethane. It is noted that this particular material provides for high flexibility, thus making it more rugged and durable than other optical fiber based pressure sensors. In Haese et al, the polymer optical fiber is subjected to pressure which is said to be much more than traditional optical fibers can take without damage. The intensity of light transmitted varies inversely with the pressure applied. It is also noted that all of the variations shown in Haese et al are designs in which the fiber is linear in alignment and the force applied is normal to the axis of the fiber.

One additional design which has attempted to employ a pressure sensitive sensor is described in Ishiharada et al U.S. Pat. No. 4,830,461. The particular cable is described as having excellent heat resistance and impact resistance. The specific problems of fiber optical systems are set forth, wherein there is an unresolvable conflict between insensitivity of glass fibers to low pressure and the deformation (and resulting damage) when high pressure is applied. For glass fiber optical fibers, as noted previously, there is no way to resolve this conflict.

Ishiharada et al describes an optical wave guide which is constructed with a core of an elastic material and a clad, with the core being made from synthetic rubber. A variety of suggested uses are described in which the pressure-sensitive sensor generates a signal which is produced by the interruption of light caused by the pressure as it is applied. The patent suggests that one major improvement is that plastic deformation of the wave guide does not cause the peeling of the light emitting and receiving from the optical wave guide portion of the cable. Apparently, because the cable is elastomeric, within limits at least the cable is stretched to keep the transducer components from pulling away from the cable as it is deformed by the pressure. It is not clear if the light transmission is due to the stretching or due to the pressure on the cable. Elastic deformation is said to produce emission of light toward the outside and also produces scattering in all directions, so that some light (but not enough to activate the light receiving sensor) is transmitted back to the transmitting end as well as toward the receiving end. In any event, Ishiharada et al does not suggest that a compact and sturdy switch can be provided which can be acted upon without direct contact by the force on the cable to cause the pressure to which Ishiharada et al's device reacts.

Accordingly, it is an object of this invention to provide an optical switch which does not deteriorate through repetitious use, such as is the case with fiber optical switch devices.

Another object of this invention is to provide a device which is adapted to act directly on the light transmitting medium rather than on a secondary part of the structure as is the case in devices where a fiber optical member is surrounded by elastomeric coaxial components.

Yet another object of this invention is to provide an optical switch device which does not require the optically sensitive portion of the device to be linearly aligned during operation of the device.

Still another object of this invention is to provide an optical switch device which is protected in an enclosed space which itself provides boundaries for the force applied, so that a direct and proportional response to outside forces is supplied by the optical portion of the device.

Other objects will appear hereinafter.

SUMMARY OF THE INVENTION

It has now been discovered that the above and other objects of the present invention may be accomplished in the following manner. Specifically, an optical switch device has been discovered which is formed in an enclosed switch chamber, preferably cylindrical in shape. Inside the chamber is an elastomeric rubber optical cable positioned in the enclosed chamber and formed into a loop. The cable terminates in a connection unit for transmitting light through the cable.

The device also includes a quantity of encapsulating elastomer which fills the enclosed chamber and encapsulated the cable. The elastomer an exposed portion which may be covered or not, and which permits actuation of the switch device upon contact on the exposed portion. The elastomer is adapted to deform upon actuation to transmit pressure to the cable. This pressure transmits flattening forces to flatten a portion of the cable and compressive forces to radially inwardly compress the cable, wherein light transmitted through the cable is altered.

Finally, the device includes means for mounting the enclosed switch chamber in a predetermined location.

In a preferred embodiment, the elastomeric encapsulating means is silicone rubber. It is also preferred to employ an elastomeric rubber optical cable which includes an optical wave transmitting core and a clad. The clad is adapted to transmit the flattening forces and the compressive forces to the core to alter the optical wave transmission of light being transmitted therein.

In the preferred embodiment, the connection to the rubber optical cable for transmitting light through the cable includes a light emitter and a light receiver. The device further including signal generator for providing a signal when the light transmitted through the cable is altered by the flattening forces and the compressive forces. Also preferred is the use of fiber optic cable for transmitting light from the light emitter to the cable and from the cable to the light receiver, to produce the signal to control that which the switch is designed to control.

BRIEF DESCRIPTION OF THE DRAWINGS

For a more complete understanding of the invention, reference is hereby made to the drawings, in which.

DETAILED DESCRIPTION OF THE PREFERRED EMBODIMENT

Figure 1:
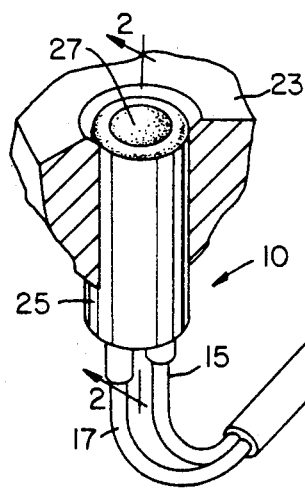
FIG. 1 is an schematic view of the preferred embodiment of the present invention, with the switch device shown in partial section and connected schematically to a power source and optical light source.
Figure 1:
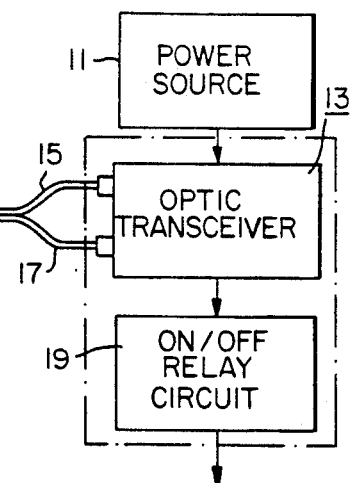

As shown in the drawings, the switch device of this invention, shown generally by reference 10, includes a power source 11 which supplies power to the optical transceiver 13. Transceiver 13 provides a light source to a transmitter cable 15 and a receiver cable 17, which in the present embodiment are fiber optical cables of conventional design. These cables 15 and 17 are well known commercial products which are admirably suited for transmitting light over significant distances without appreciable loss of light.

Depending on how the device is designed to operate, light returned to transceiver 13 via cable 17 will produce a signal to indicate that the light continues to travel in cable 17 or that it has been interrupted and no longer travels in cable 17. The switch function in electronic package 19 then produces the programmed signal or other function as designed. For example, interruption of light travel in the switch will be transmitted via cable 17 to the electronic package 19, signaling a relay, on/off gate, or other conventional signal receiving unit, which in turn functions as switch to operate a motor, turn on or off a light or other electrically powered device, sound an alarm, or whatever.

Power source 11, optic transceiver 13 and electronic package 19 are all conventional optical switch components which indicate that the switching function has been performed at a switch which is removed from or remote from these three units of the device. In other words, if a mechanical switch were located between transmitter cable 15 and receiver cable 17, the device would function in a known manner, although it would not be an optical switch device. Similarly, if the switch portion of this system were to have been made from a fiber optic cable, the optical switch would be subjected to the drawbacks described previously herein and would fail before any practical amount of use.

In the present invention, cables 15 and 17 are sheathed in protective cable cover 21. The protected cables 15 and 17 are positioned in a permanent position, to avoid damage to the fiber optic materials forming cables 15 and 17, as the device is installed in its intended place of use. FIG. 1 shows cables 15 and 17 entering a switch which has been mounted on a surface 23, such as part of a whirlpool bath, and it includes a cylinder 25 which encloses the switching components and provides a contact portion 27 for activation of the switch.

One particularly important place of use is in association with appliances and the like such as whirlpool baths. Devices such as whirlpool baths and the like are becoming much more popular in home environments and the like. Unfortunately, care in construction and assembly has not always been perfect and a potential, at least, for danger exists where electricity and water are too closely associated. In commercial designs, the switch is placed at a location which is remote from the whirlpool bath, causing the user to get out of the tub and go to the switch so that the operator or user does not operate an electrical switch while immersed in water. The potential for danger is too great to allow actual electrical current to pass through switches which might be operated by a person in water, even with excellent insulation of the switch itself.

In the present invention, switch activating contact portion 27 never has any electrical current associated with it in any form, so that cylinder 25 can be mounted on surface 23 at a location which is close to the user. There is no risk of electrical contact to one pushing the actuation portion 27 of the switch, and so the device can be located in a position which can be reached by the person using the whirlpool bath or whatever appliance is in use. Similarly, it is noted, such a switch can be located in regions which contain explosive fumes, such as in areas where explosive solvents and fuels are present, without fear of causing a spark to potentially ignite an explosion.

Figure 2:
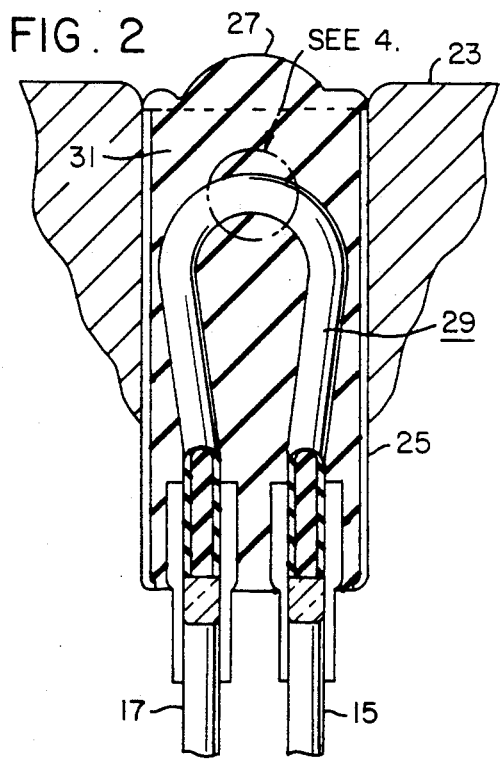
FIG. 2 is a sectional view of the switch device of this invention, taken along line 2,2 of FIG. 1.

The essence of the present invention is shown in detail in FIG. 2. Inside cylinder 25 is an elastomeric rubber optical cable 29 which has been deformed into a fully circular bend in on itself, so that the cable 29 makes a 180° loop. One end of cable 29 is connected to light transmitting cable 15 and the other end to light receiving cable 17. Thus light waves are transmitted from transceiver 13 through transmitting cable 15 to the elastomeric cable 29. Light continues to flow through cable 29 under normal or steady state conditions and exits cable 29 via receiving cable 17 where the light then is returned to the transceiver 13 as described above.

Connections to cable 29 are conventional and shown in section as the light transmitting axes of cables 15 and 17 are aligned with the core of cable 29. Cylinder 25 is also filled with an elastomeric material 31, such as silicone rubber, to fix the position of cable 29 and also to transmit force from contact portion 27 which is exposed to the outside of cylinder 25.

Figure 4:
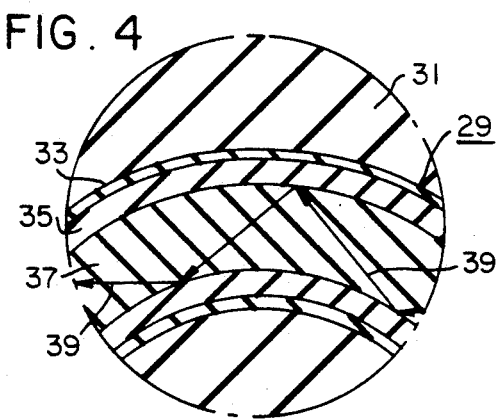
FIG. 4 is an enlarged sectional view of the details shown in the circle in FIG. 2 and identified FIG. 4.

Cable 29 is shown in greater, enlarged detail in FIG. 4, as elastomeric material 31 surrounds a cable having an outer cover 33, a clad 35 formed from a lower refractive index silicone rubber, for example, and a core 37 which is formed from a silicone rubber having a higher refractive index. Light enters core 37 from light transmitting cable 15, via the connections shown in FIG. 2, and is transmitted through core 37, shown schematically by arrows 39, so that the light exits core 37 through light receiving cable 17.

Figure 3:
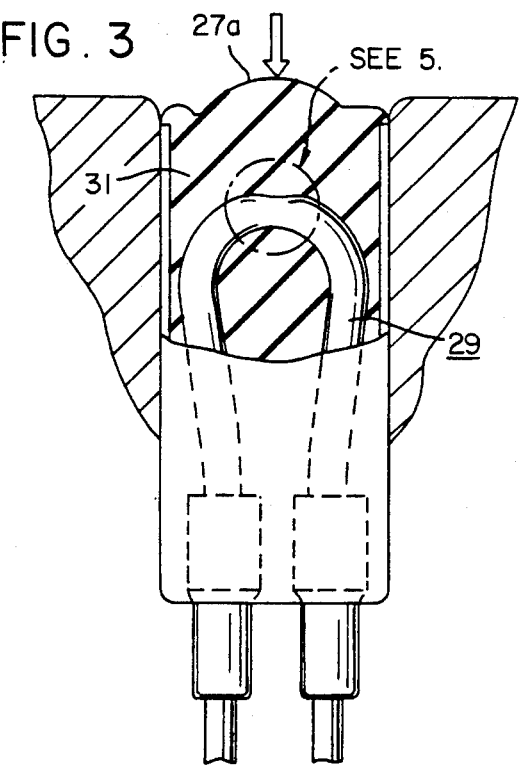
FIG. 3 is a sectional view similar to FIG. 2, with the application of force to operate the switch being illustrated.
Figure 5:
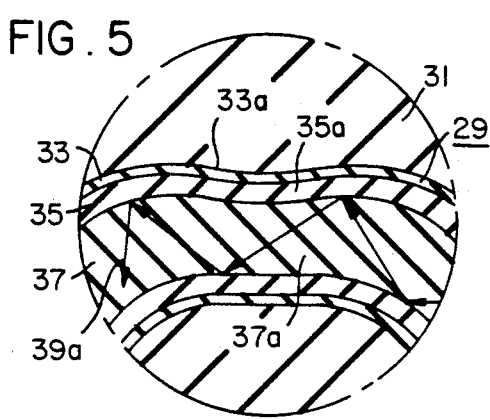
FIG. 5 is an enlarged sectional view of the details shown in the circle in FIG. 3 and identified FIG. 5.

When a force is applied to the contact portion 27 of the switch, such as at 27a of FIG. 3, that force is transmitted by the elastomeric material, in a pseudo-hydraulic transmission of force, to act on cable 29 and cause a flattening and compression of cable 29. Shown in FIG. 5 are the effects of force 27a, which compresses the cable 29 and flattens cover 33 at region 33a, clad 35 at region 35a and, most importantly, core 37 at region 37a. Light travel is interrupted, as shown schematically by arrows 39a and a signal is generated as described above.

As shown above, cable 29 is formed into a loop such that it is deformed into a fully circular bend in on itself. It has been found that the sensitivity and durability of the optical switch of this invention is markedly improved when cable 29 makes a 180° loop. As cable 29 is fixed in position by elastomer 31, and elastomer 31 supports cable connectors 41, in combination with cylinder 25, cable 29 is under forces of compression on the inside radius and stretching on the outside radius of the loop. Force applied to contact portion 27 is then transmitted to the looped cable as the cable 29 is transmitting light in a steady state condition, resulting in effective use of both of the compression and stretching forces acting on the cable 29 as it is in steady state. Much greater sensitivity and reliability is achieved when cable 29 is in this orientation.

In order to demonstrate the effectiveness of the present invention, use of a switch similar to that shown in the figures were made over a sufficient number of repetitions to demonstrate that the switch is sufficiently durable to outlast normal expected needs. In comparison tests, fiber optic cable was substituted for the elastomeric rubber optical cable as described above, and an operative model was not successfully manufactured. It was not possible to form the glass fiber cable into a loop of sufficiently small radius to be practical in a switch design. Additional tests of the glass fiber cable showed rapid deterioration and breakdown under preliminary use as a switch member, indicating that the fiber itself breaks down under compressive and flattening forces.

In additional tests, the fiber optical transmission and receiving cables shown in the figures as elements 15 and 17 were replaced with lengths of cable 29 as described. This experiment was unsuccessful because cable 29 could not transmit sufficient light to allow the electrical portion of the device to be placed a safe distance from the switch portion. Thus, only with the combination of (1) an elastomeric rubber optical cable formed under tension in a loop as described herein and (2) a fiber optic transmission and receiving cable is it possible to provide a safe and reliable optical switch device which can be operated in potentially dangerous situations such as where water or explosive fumes are present.

While particular embodiments of the present invention have been illustrated and described, it is not intended to limit the invention, except as defined by the following claims.

I claim:

1. An optical switch assembly, comprising:
   an enclosed switch chamber having a longitudinal axis;
   an elastomeric optical cable positioned in said enclosed cylindrical switch chamber and formed into a loop to form an apex along said longitudinal axis, said optical cable terminating in connection means for transmitting light through said optical cable, said connection means including light emitting means and light receiving means and including fiber optic means for transmitting light from said light emitting means to said optical cable and from said optical cable to said light receiving means;

elastomeric means encapsulating said optical cable in said switch chamber including an exposed portion proximate said apex of said loop for application of pressure on said exposed portion along said longitudinal axis transmitting flattening forces to a portion of said optical cable proximate said apex and compressive forces to radially inwardly compress said optical cable to thereby alter light transmitted through said optical cable providing means for actuating said switch device; and signal means providing a signal when said light transmitted through said optical cable is altered by said flattening forces and said compressive forces.

2. The device of claim 1, wherein said enclosed switch chamber is a cylinder.

3. The device of claim 2, wherein said elastomeric encapsulating means is silicone rubber.

4. The device of claim 3, wherein said elastomeric rubber optical cable comprises an optical wave transmitting core and a clad formed into a 180° loop, said clad being adapted to transmit said flattening forces and said compressive forces to said core to alter the optical wave transmission of light being transmitted therein.

5. The device of claim 1, wherein said connection means for transmitting light through said cable includes a light emitting means and a light receiving means, said device further including signal means for providing a signal when said light transmitting through said cable is altered by said flattening forces and said compressive forces.

6. The device of claim 5, which further includes fiber optic means for transmitting light from said light emitting means to said cable and from said cable to said light receiving means.

* * * * *